(12) United States Patent
Julien et al.

(10) Patent No.: US 10,993,573 B2
(45) Date of Patent: May 4, 2021

(54) PRESSURE COOKER WITH IMPROVED SAFETY

(71) Applicant: SEB S.A., Ecully (FR)

(72) Inventors: Guillaume Julien, Selongey (FR); Eric Chameroy, Veronnes (FR); Eric Rhetat, Dijon (FR)

(73) Assignee: SEB S.A., Ecully (FR)

( * ) Notice: Subject to any disclaimer, the term of this patent is extended or adjusted under 35 U.S.C. 154(b) by 278 days.

(21) Appl. No.: 15/479,822

(22) Filed: Apr. 5, 2017

(65) Prior Publication Data
US 2017/0290452 A1 Oct. 12, 2017

(30) Foreign Application Priority Data

Apr. 8, 2016 (FR) ...................................... 16 53140

(51) Int. Cl.
| | | |
|---|---|---|
| A47J 27/08 | (2006.01) | |
| A23L 5/10 | (2016.01) | |
| A47J 27/09 | (2006.01) | |

(52) U.S. Cl.
CPC .............. *A47J 27/0806* (2013.01); *A23L 5/17* (2016.08); *A47J 27/08* (2013.01); *A47J 27/0802* (2013.01); *A47J 27/09* (2013.01); *A23V 2002/00* (2013.01)

(58) Field of Classification Search
CPC .... A47J 27/0806; A47J 27/08; A47J 27/0802; A47J 27/09; A23L 5/17; A23V 2002/00
USPC .................. 99/337, 338, 324, 467, 473–474; 220/89.1
See application file for complete search history.

(56) References Cited

U.S. PATENT DOCUMENTS

| | | |
|---|---|---|
| 2,583,085 A | 1/1952 | Campbell |
| 2,600,703 A | 6/1952 | Strom |
| 2,660,330 A | 11/1953 | Keller |
| 3,653,533 A | 4/1972 | Mortensen |
| 3,655,090 A | 4/1972 | Rothrock et al. |
| 3,876,385 A | 4/1975 | Markus |
| 4,276,990 A | 7/1981 | Chiodo |

(Continued)

FOREIGN PATENT DOCUMENTS

| | | |
|---|---|---|
| BR | 8601076 A | 10/1987 |
| CH | 571335 A5 | 1/1976 |

(Continued)

OTHER PUBLICATIONS

Machine Translation of Chinese Patent Pub. CN202457960, Jinxian Li, Oct. 3, 2012 (Year: 2012).*

(Continued)

*Primary Examiner* — Dana Ross
*Assistant Examiner* — Michael S. Poetzinger
(74) *Attorney, Agent, or Firm* — Loeb & Loeb LLP

(57) ABSTRACT

The invention relates to a pressure cooking utensil comprising a vessel, a lid with an annular skirt, and a gasket interposed between the lid and the vessel, said gasket including a ring and a first lip in sealing contact with the top wall of the lid, said utensil being characterized in that it includes a leakage opening formed through said top wall, the annular skirt forming a stop abutment for the ring, said first lip presenting flexibility that is suitable, when the pressure that exists inside the enclosure exceeds a safety threshold, for causing the inside of the enclosure to communicate with the outside through the leakage opening.

15 Claims, 4 Drawing Sheets

(56) References Cited

U.S. PATENT DOCUMENTS

| | | | |
|---|---|---|---|
| 5,695,319 | A | 12/1997 | Matsumoto et al. |
| 5,768,976 | A | 6/1998 | Suk |
| 6,425,320 | B1 | 7/2002 | Chameroy |
| 8,096,436 | B2 | 1/2012 | Rhetat et al. |
| 9,320,381 | B2 | 4/2016 | Chameroy et al. |
| 2003/0024936 | A1 | 2/2003 | Niese |
| 2008/0196599 | A1 | 8/2008 | Bhagat |
| 2009/0101643 | A1 | 4/2009 | Rhetat et al. |
| 2011/0011274 | A1* | 1/2011 | Thelen .................... A47J 27/09 99/337 |
| 2013/0068113 | A1 | 3/2013 | Chameroy et al. |
| 2014/0339223 | A1* | 11/2014 | Backaert ............... A47J 27/092 219/732 |
| 2014/0360384 | A1 | 12/2014 | Kim |

FOREIGN PATENT DOCUMENTS

| | | | |
|---|---|---|---|
| CH | 694356 | A5 | 12/2004 |
| CN | 2389593 | Y | 8/2000 |
| CN | 2469839 | Y | 1/2002 |
| CN | 201624512 | U | 11/2010 |
| CN | 102349791 | A | 2/2012 |
| CN | 102166092 | B | 5/2013 |
| CN | 203000535 | U | 6/2013 |
| DE | 3703448 | A1 | 8/1988 |
| DE | 29508504 | U1 | 9/1995 |
| EP | 0743036 | A1 | 11/1996 |
| EP | 2258243 | A1 | 12/2010 |
| EP | 2732736 | A1 | 5/2014 |
| FR | 2782257 | A1 | 2/2000 |
| FR | 2783687 | A1 | 3/2000 |
| GB | 641540 | A | 8/1950 |
| GB | 657982 | A | 10/1951 |
| GB | 2208131 | A * | 3/1989 .............. A47J 27/09 |
| JP | S5898018 | U | 7/1983 |
| WO | 0143605 | A1 | 6/2001 |
| WO | 2013039332 | A2 | 3/2013 |

OTHER PUBLICATIONS

Livingston, E., Scavuzzo, R. J. "Pressure Vessels", The Engineering Handbook, CRC Press LLC, 2000 (Year: 2000).*

Semiatin, S.L.. ASM Handbook, vol. 14B—Metalworking: Sheet Forming—Table of Contents. ASM International, 2006 (Year: 2006).*

International Searching Authority, International Search Report, in International Application No. PCT/FR2015/050786, dated Jul. 10, 2015, 7 pages.

International Searching Authority, Written Opinion, in International Application No. PCT/FR2015/050786, dated Oct. 1, 2015, 10 pages.

Search Report and Written Opinion issued by Institut National de la Propriété Industrielle, for French Patent Application No. 1552579, dated Feb. 2, 2016, 7 pages.

Search Report and Written Opinion issued by Institut National de la Propriété Industrielle, for French Patent Application No. 1554997, dated Mar. 31, 2016, 6 pages.

Search Report and Written Opinion issued by Institut National de la Propriété Industrielle, for French Patent Application No. 1554999, dated Mar. 22, 2016, 6 pages.

Search Report and Written Opinion issued by Institut National de la Propriété Industrielle, for French Patent Application No. 1555000, dated Mar. 22, 2016, 6 pages.

Search Report and Written Opinion issued by Institut National de la Propriété Industrielle, for French Patent Application No. 1555001, dated Mar. 22, 2016, 6 pages.

Search Report issued by Institut National de la Propriété Industrielle, for French Patent Application No. 1653140, dated Nov. 23, 2016, 2 pages.

Office Action dated May 7, 2018 for U.S. Appl. No. 15/172,048 (pp. 1-7).

Notice of Allowance dated May 23, 2018 for U.S. Appl. No. 15/172,054 (pp. 1-5).

International Searching Authority, Written Opinion, international Application No. PCT/FR2015/050786, dated Oct. 1, 2015, 5 pages.

Office Action dated Aug. 13, 2018 for U.S. Appl. No. 15/081,303 (pp. 1-9).

Translation of EP2926697A1, Colas et al., Appliance for Cooking Food Under Pressure with Inveted Bayonets and Related Manufacturing Method. Jul. 10, 2015. (Year: 2015).

Office Action dated Oct. 3, 2019 for U.S. Appl. No. 15/129,104 (pp. 1-13).

* cited by examiner

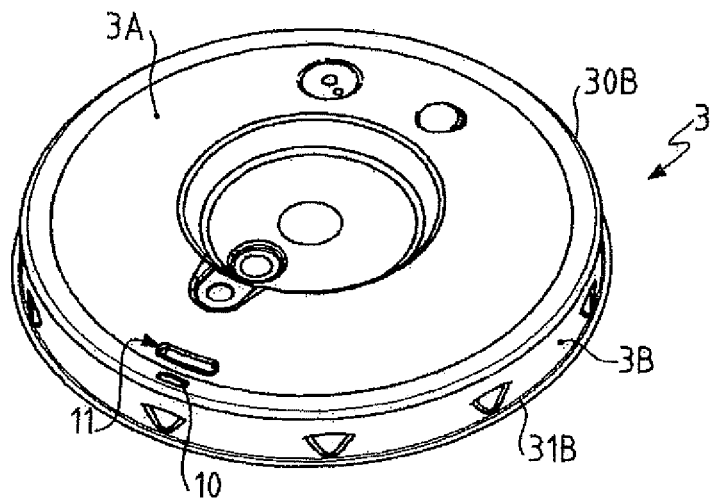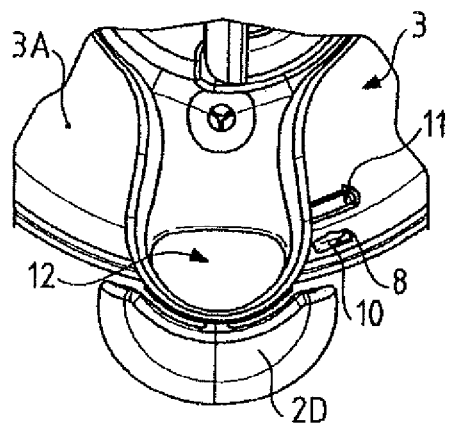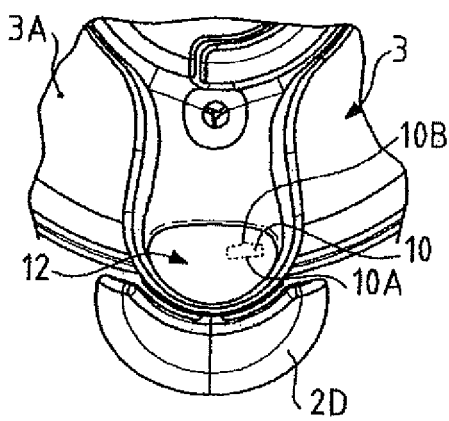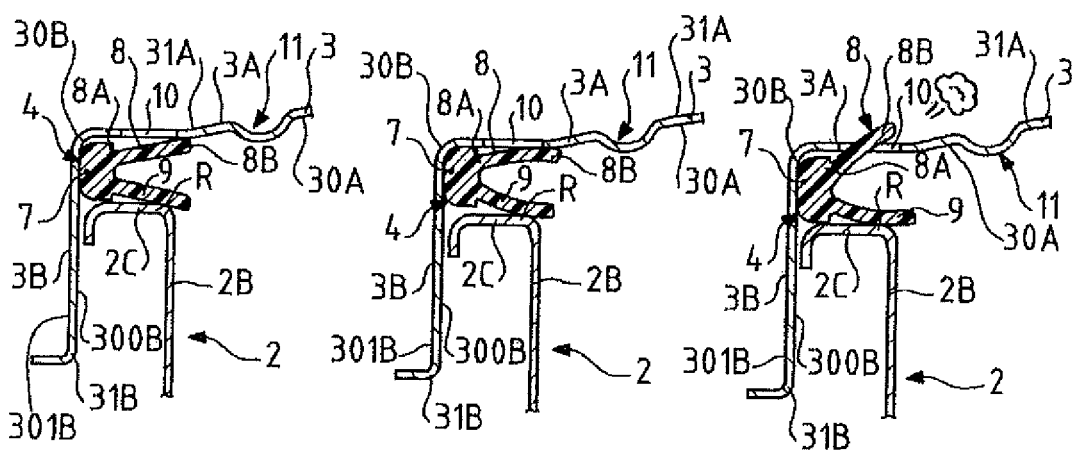

PRESSURE COOKER WITH IMPROVED SAFETY

CROSS-REFERENCES TO RELATED APPLICATIONS

This application claims priority to, and the benefit of, French Patent Application No. FR-16 53140, filed Apr. 8, 2016, entitled "A Pressure Cooker With Improved Safety," the entire contents of which is incorporated herein by reference.

BACKGROUND

The present invention relates to the general technical field of utensils for cooking food under pressure in a steam-filled atmosphere, preferably for home use, and in particular to a utensil of the kind known as a "pressure cooker" that is fitted with a sealing gasket put into place between the vessel and its lid in order to provide sealing, in operation, between the inside and the outside of the utensil, and thus allow pressure to rise inside the utensil.

SUMMARY OF THE INVENTION

The present invention relates more particularly to a cooking utensil for cooking food under pressure and comprising a vessel and a lid for co-operating with said vessel to form a cooking enclosure, said lid having a top wall presenting a peripheral outline that is substantially circular or oval and from which there extends an annular skirt, said utensil also having a sealing gasket interposed between the lid and the vessel in order to enable the pressure inside the cooking enclosure to rise, said sealing gasket comprising a peripheral annular ring together with a first flexible lip projecting from said ring towards the inside of the utensil in a direction that is mainly radially inwards, between a root secured to the ring and a free end portion in sealing contact with said top wall of the lid.

The present invention also relates to a method of safely depressurizing a utensil for cooking food under pressure, the utensil comprising a vessel and a lid for co-operating with said vessel to form a cooking enclosure, said lid having a top wall presenting a peripheral outline that is substantially circular or oval, said utensil also having a sealing gasket interposed between the lid and the vessel in order to enable the pressure inside the cooking enclosure to rise, said sealing gasket comprising a peripheral annular ring together with a first flexible lip projecting from said ring towards the inside of the utensil in a direction that is mainly radially inwards, between a root secured to the ring and a free end portion in sealing contact with said top wall of the lid.

It is already known to have recourse to sealing gaskets that are interposed and compressed between the vessel and the lid of a pressure cooker in particular for the purpose of providing the utensil with sealing while in operation, which gaskets may be made of elastomer materials, for example, in particular because of their flexibility and suitability for being compressed.

The gaskets used present various profiles that are adapted to different types of pressure cooking utensil and that may be referred to as cord type gaskets or as lip gaskets.

It is also known to use such gaskets as additional safety devices enabling the pressure inside the utensil to be lowered by steam escaping from the cooking enclosure. Specifically, it is found that the conventional devices that are specifically dedicated to safety and that are usually fitted to pressure cooking utensils, such as safety valves, can fail for multiple reasons (ageing, soiling, insufficient maintenance, clogging, blocking, obstruction with food, or other accidental malfunctions, . . . ).

In such situations, the pressure inside the cooking enclosure can rise in operation without conventional safety devices being able to perform their function by allowing the utensil to lose pressure automatically as soon as an incident of this type occurs.

Under such circumstances, it is thus already known to make use of the sealing gasket of the pressure cooking utensil as additional safety means by taking advantage of the natural deformation properties of the gasket under the effect of excess pressure existing inside the enclosure, which excess pressure causes the gasket to move away from its sealing position so as to enable steam to escape, thereby leading to a drop of pressure in the enclosure.

Among pressure cooking utensils that make use of such a localized leak of steam resulting from movement of the gasket to perform an additional safety function, systems are known that make use of radial deformation of the gasket through a window formed in the dropped edge of the lid.

Thus, a bayonet pressure cooker is known more particularly that has a gasket with a ring from which there extend both a top lip in sealing contact with the lid and also a bottom lip in sealing contact with the top edge of the vessel, while the ring is placed facing the dropped edge of the lid. That utensil also has a window arranged locally through the dropped edge of the lid. In the event of abnormal excess pressure, the ring of the gasket is subjected locally to outward radial movement through the window, thereby locally entraining the bottom lip radially outwards until the lip is no longer in sealing contact with the top edge of the vessel. This localized loss of sealing contact between the vessel and the bottom lip leads to the inside of the enclosure being put into communication with the outside, thereby enabling the cooking enclosure to be depressurized.

Such an additional safety device with a window generally gives satisfaction since it enables excess pressure to be discharged.

Nevertheless it presents serious drawbacks.

Thus, a first drawback relates to the absence of control over the localized outward radial movement of the gasket through the window formed in the dropped edge of the lid. Solving that problem is particularly complex insofar as it depends specifically on the shaping and the positioning of the window, which are themselves constrained by mechanical strength requirements for the lid (which prevents the window being dimensioned and positioned in totally free manner). In practice, this difficulty for the gasket to move through the window is likely to lead to a phenomenon of the steam escaping violently, which might put out the flame of the cooking plate (e.g. a gas hob) and/or thrust the pressure cooker by a reaction effect, with all of the risks that that might give rise to (gas leak, pressure cooker turning over or dropping, etc.).

It is also found that that known design leads to large dispersion in the value of the pressure at which the additional safety effect is triggered (i.e. local loss of sealingness between the gasket and the vessel).

That large dispersion is due in particular to the large number of parameters involved, such as in particular and in non-limiting manner:

the shapes of the components (shape of the top edge of the vessel, shapes of the lid and of the window that is formed in its dropped edge, shape and thickness of the gasket, design of the locking system, etc.); and the characteristics of the materials from which the components are made (in particular the hardness of the elastomers used for making the gasket, the mechanical characteristics, and in particular the elastic limit, of the metals used for making the vessel and the lid, etc.).

This large number of parameters having influences and interactions that are poorly or insufficiently known and controlled, makes it impossible in practice to transpose any one such additional safety system with a window to act in identical manner from one model of pressure cooker to another model of pressure cooker that is of different design and/or fabrication, even if the difference between them is very small. For example, the way in which the leak occurs and the threshold pressure value for triggering the leak can be influenced by the nature of the material used for making the vessel (aluminum or stainless steel). This impossibility of transposition from one model to another naturally constitutes a major drawback in industrial terms.

Finally, the insufficient control over triggering of the excess pressure safety by means of the gasket can lead to problems of safety and comfort in use, since there may be an overlap between the trigger pressure ranges of the various devices involved (excess pressure safety valve and additional safety device by localized movement of the gasket), which can disturb the sequencing of triggering of the safety devices in question and can thus give rise to major annoyances for users if the safety devices in question come into operation chaotically.

Consequently, the objects given to the present invention seek to remedy the various above-listed drawbacks and to propose a novel utensil for cooking food under pressure, and also a novel method of safety depressurization of a utensil for cooking food under pressure, that make it possible, while ensuring excellent operating safety in the event of accidental excess pressure, for the utensil to operate in a manner that is particularly reliable, robust, and well controlled under these particular excess pressure conditions, and in particular avoiding any violent phenomenon and limiting any dispersion in the value of the pressure at which safety depressurization is triggered.

Another object of the invention seeks to propose a novel utensil for cooking under pressure, and a novel method of safety depressurization of the utensil for cooking food under pressure, enabling the utensil to be depressurized in particularly effective manner in the event of accidental excess pressure, while preserving the mechanical strength of the lid.

Another object of the invention seeks to propose a novel utensil for cooking food under pressure, and a novel method of safety depressurization of the utensil for cooking food under pressure, that rely on using a sealing gasket of design that is extremely simple and does not require any special precaution or competence for installing it in the utensil.

Another object of the invention seeks to propose a novel utensil for cooking food under pressure, and a novel method of safety depressurization of the utensil for cooking food under pressure, that enable the utensil for cooking food under pressure to be depressurized particularly quickly in the event of accidental excess pressure.

Another object of the invention seeks to propose a novel utensil for cooking food under pressure, and a novel method of safety depressurization of the utensil for cooking food under pressure, that guarantee that the depressurization of the utensil is triggered at an accurate pressure threshold.

Another object of the invention seeks to propose a novel utensil for cooking food under pressure, and a novel method of safety depressurization of the utensil for cooking food under pressure, that rely on using means that are extremely simple and inexpensive.

Another object of the invention seeks to propose a novel utensil for cooking food under pressure, and a novel method of safety depressurization of the utensil for cooking food under pressure, that limit the risk of the user being scalded by a jet of steam when depressurization is triggered in response to accidental excess pressure.

Another object of the invention seeks to propose a novel utensil for cooking food under pressure, and a novel method of safety depressurization of the utensil for cooking food under pressure, that rely on a universal design that is compatible with all types of pressure cooking utensil.

The objects given to the invention are achieved by a cooking utensil for cooking food under pressure and comprising a vessel and a lid for co-operating with said vessel to form a cooking enclosure, said lid having a top wall presenting a peripheral outline that is substantially circular or oval and from which there extends an annular skirt, said utensil also having a sealing gasket interposed between the lid and the vessel in order to enable the pressure inside the cooking enclosure to rise, said sealing gasket comprising a peripheral annular ring together with a first flexible lip projecting from said ring towards the inside of the utensil in a direction that is mainly radially inwards, between a root secured to the ring and a free end portion in sealing contact with said top wall of the lid, said utensil being characterized in that it includes a leakage opening formed through said top wall above the sealing gasket so as to be hermetically closed by the gasket so long as the pressure that exists inside the enclosure does not exceed a safety threshold, the annular skirt forming a stop abutment for the ring preventing any outward radial movement of the gasket in register with the leakage opening, said first lip presenting flexibility that is appropriate for the free end portion to be pushed back locally through the leakage opening as soon as the pressure that exists inside the enclosure exceeds said safety threshold, thus causing the inside of the enclosure to communicate with the outside via the leakage opening in order to cause the pressure inside the enclosure to drop.

The objects given to the invention are also achieved by a method of safely depressurizing a utensil for cooking food under pressure, the utensil comprising a vessel and a lid for co-operating with said vessel to form a cooking enclosure, said lid having a top wall presenting a peripheral outline that is substantially circular or oval, said utensil also having a sealing gasket interposed between the lid and the vessel in order to enable the pressure inside the cooking enclosure to rise, said sealing gasket comprising a peripheral annular ring together with a first flexible lip projecting from said ring towards the inside of the utensil in a direction that is mainly radially inwards, between a root secured to the ring and a free end portion in sealing contact with said top wall of the lid, said method being characterized in that the utensil for cooking food under pressure has a leakage opening formed through said top wall above the sealing gasket so as to be hermetically closed by the gasket so long as the pressure that exists inside the enclosure does not exceed a safety threshold, said method comprising, when the pressure exceeds the safety threshold, a step of deforming the first lip, during which said first lip is subjected under the effect of the pressure that exists inside the enclosure to sufficient bending for the free end portion to be pushed locally through the leakage opening so as to cause the inside of the enclosure to communicate with the outside through the leakage opening so as to cause the pressure inside the enclosure to drop, the ring being held in such a manner as to prevent any outward radial movement of the gasket in register with the leakage opening under the effect of the pressure that exists inside the enclosure.

Other objects and advantages of the invention appear and can be seen in greater detail on reading the following description with reference to the accompanying drawings, which are given purely by way of nonlimiting illustration, and in which:

BRIEF DESCRIPTION OF THE DRAWINGS

FIG. 5 shows a metal lid forming a portion of the lid subassembly of FIG. 4.

FIG. 6 is a view from above of a detail of FIG. 1.

FIG. 7 is a view from above of a detail of FIG. 2.

FIGS. 8 to 10 show, in diagrammatic manner, in chronological order, and in cross-section view, the movement and the deformation to which the sealing gasket fitted to the pressure cooker of the above figures is subjected locally when the pressure inside the cooking enclosure exceeds a predetermined safety threshold, thereby leading to the gasket passing from a sealing configuration (FIG. 8) to a local leakage configuration (FIG. 10), via an intermediate configuration (FIG. 9).

DETAILED DESCRIPTION

As shown in the figures, the invention relates to a utensil 1 for cooking food under pressure that is to cook various foods at a pressure level higher than atmospheric pressure in the presence of vapor, and for example in the presence of steam. Said vapor is generated by heating a cooking liquid, e.g. an aqueous liquid, inside the utensil 1 and in the presence of food. The utensil 1 of the invention is preferably for home use, it nevertheless being understood that the invention can also be applied to utensils that are professional or semi-professional. The utensil 1 in accordance with the invention is designed to rise in pressure exclusively under the effect of a source of heat (internal or external), without any external supply of pressure. The utensil 1 for cooking food under pressure thus constitutes a pressure cooker, preferably intended for placing on an independent hob in order to heat its content. The cooking utensil 1 in accordance with the invention comprises at least one vessel 2 forming a cooking container that is to receive the food for cooking and that specifically presents substantially circular symmetry about a central vertical axis X-X', which extends in a direction close to the vertical direction when the utensil 1 is in normal operation, i.e. when it is standing on a horizontal plane. Nevertheless, in an alternative variant (not shown), it is entirely possible to envisage that the vessel does not present a circular outline as shown in the figures, but rather an outline that is oval, without that going beyond the ambit of the invention. In conventional manner, the vessel 2 is made out of a metal material, such as stainless steel or aluminum. The vessel 2 has a bottom 2A, which may for example be a multi-layer thermally-conductive bottom. The vessel 2 also has an annular side wall 2B that extends upwards between said bottom 2A and a free top edge 2C, which is specifically circular in shape (but that could alternatively present an oval shape), and that defines an opening giving access to the inside of the vessel 2. The shape of the free top edge 2C is described in greater detail below, with reference to the means for locking the utensil 1. As can be seen in particular in FIG. 3, the free top edge 2C of the vessel 2, which forms the terminal portion of the side wall 2B, extends outwards, e.g. radially, from the vessel 2 in order to form at least one annular surface that defines a rest zone R against which the sealing gasket 4 that is described in greater detail below comes to rest.

Advantageously, and as shown in the figures, the cooking utensil 1 includes at least one vessel handle 2D that is fastened to said vessel 2, so as to project outwards therefrom. In the embodiment shown in the figures, the cooking utensil 1 has two identical handles 2D and 2E fastened to the side wall 2B of the vessel 2 in diametrically opposite positions relative to the central axis X-X'.

Figure 1:
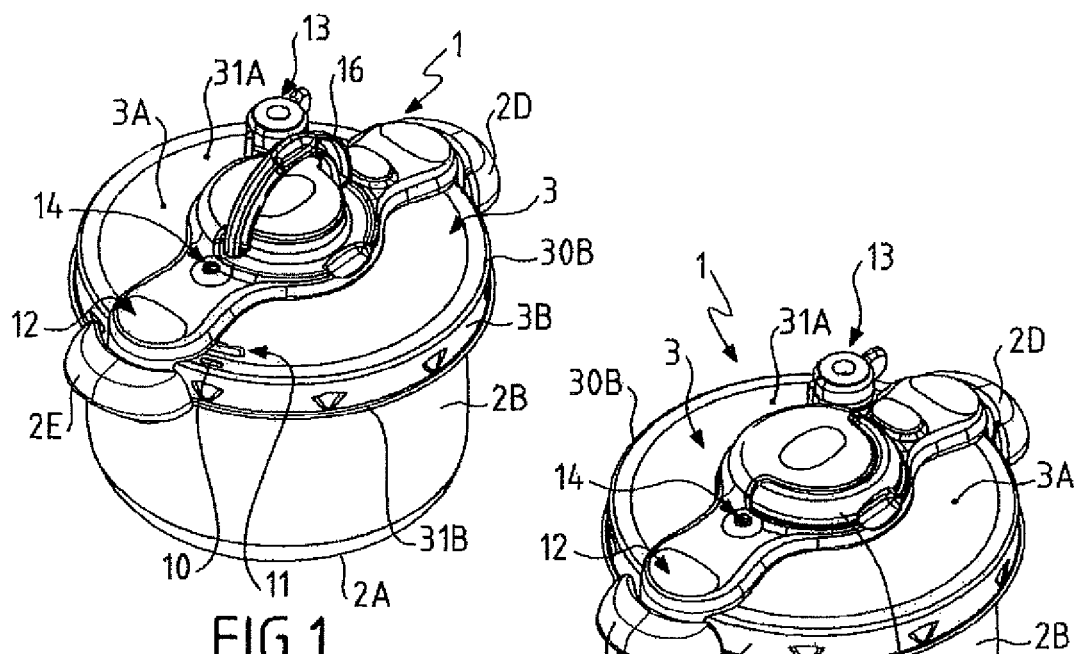
FIG. 1 is a diagrammatic perspective view showing a utensil in accordance with the invention for cooking food under pressure, which utensil is in a configuration for pre-locking the lid relative to the vessel.
Figure 2:
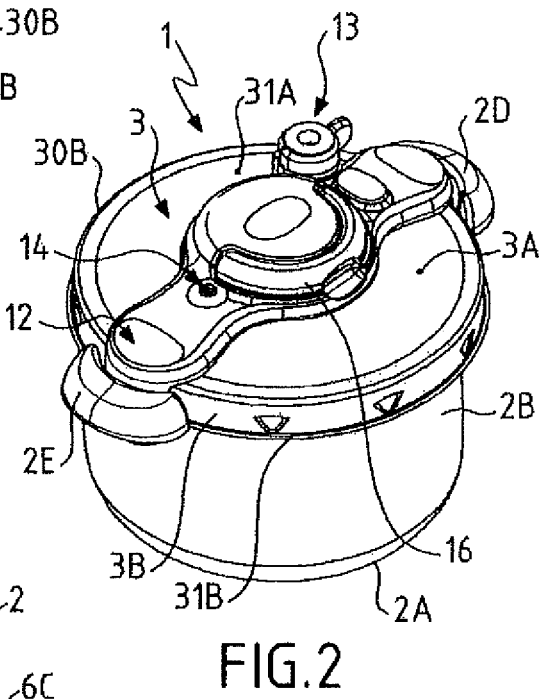
FIG. 2 shows the FIG. 1 food cooking utensil with the lid locked relative to the vessel.

The utensil 1 in accordance with the invention also has a lid 3 for co-operating with said vessel 2 to form a cooking enclosure. In conventional manner, the lid 3 is made out of a metal material, such as stainless steel or aluminum. It is advantageously complementary in shape to the shape of the vessel 2 so as to be capable of engaging in or on the vessel, as shown in FIGS. 1 and 2, for example. As shown in the figures, the lid 3 comprises a top wall 3A that forms a covering element of shape and dimensions that are substantially complementary to the shape and dimensions of the access opening defined by the free top edge 2C of the annular side wall 2B of the vessel 2. Said top wall 3A thus presents a peripheral outline of shape that is substantially circular (when the free top edge 2C itself presents an outline that is substantially circular) or substantially oval (for a vessel 2 having a free top edge 2C that presents an oval outline). In the embodiment shown in the figures, the lid 3 also includes an annular skirt 3B that extends from said peripheral outline of the top wall 3A. As shown in the figures, said annular skirt 3B is advantageously substantially cylindrical or frustoconical in shape, extending between a first circular or oval edge 30B secured to the lid element formed by the top wall 3A, and a second circular edge 31B that is free, which edge may for example itself be extended by a terminal collar. As shown in the figures, the disk-shaped covering element formed by the top wall 3A extends generally in a mean horizontal plane, i.e. specifically parallel to the main plane in which the bottom 2A of the vessel 2 extends when the lid 3 is associated with the vessel 2 in order to form the cooking enclosure, while the annular skirt 3B forms a belt that extends substantially vertically, i.e. parallel to the central axis X-X', the above-mentioned terminal collar itself extending substantially horizontally. Naturally, that does not in any way exclude the top wall 3A being locally rounded or curved, e.g. in order to receive a control mechanism, as shown in FIG. 5. The top wall 3A advantageously presents a bottom face 30A arranged facing the inside of the vessel 2, and an opposite outside face 31A, while the annular skirt 3B also presents an inside face 300B directed towards the inside of the utensil, i.e. towards the central axis X-X', and an opposite outside face 301B. The inside face of the lid 3 is thus then formed by the inside face 30A of the top wall 3A and by the inside face 300B of the annular skirt 3B. In the embodiment shown in the figures, the annular skirt 3B is formed by a dropped edge that extends downwards from the periphery of the top wall 3A. In this embodiment, the lid 3 is designed to cover the top of the vessel 2 in substantially fitted manner so that the annular skirt 3B forms a belt around the outside of the top of the annular side wall 2B and the free top edge 2C, while the top wall 3A rests on the free edge 2C via a sealing gasket 4 interposed between the vessel 2 and the lid 3, and that is described in greater detail below. Nevertheless, it is entirely possible to envisage that the annular skirt 3B is designed, alternatively, to be inserted within the vessel 2, so as to be surrounded by and contained within the vessel 2, without that going beyond the ambit of the invention. The vessel 2 and the lid 3 thus constitute respective complementary shells that are preferably made of metal (e.g. stainless steel or aluminum), and that once they have been associated with each other, they form a resulting metal shell defining a closed volume within which food is to be cooked under steam pressure.

In order to prevent the lid 3 separating from the vessel 2 under the effect of the rise in pressure, the cooking utensil 1 of the invention conventionally includes a locking/unlocking system for locking/unlocking the lid 3 relative to the vessel 2, enabling the user to lock the lid 3 relative to the vessel 2 in order to cook food under pressure inside the enclosure, or to unlock the utensil 1 in order to gain access to the inside of the vessel 2. The locking/unlocking system may be formed by any conventional device as is well known in the field, and for example it may be a bayonet system (as in the example shown in the figures) or a movable jaw system (e.g. formed by at least one and preferably two locking jaws that are mounted to move radially on the lid), or a movable segment system (formed by radially movable tabs, each having an end that is to be received in a cavity or an orifice formed in the wall of the vessel 2), or any other known system (e.g. a clamp system).

In the embodiment shown in the figures, the bayonet locking/unlocking system is designed to lock and unlock the lid 3 relative to the vessel 2 by turning the lid 3 relative to the vessel 2 about said central vertical axis X-X' in order to cause the utensil 1 to pass in this way from a configuration of waiting for locking (shown in FIG. 1) in which the lid 3 is placed on the vessel 2 and rests freely thereon, to a locked configuration (shown in FIG. 2) in which the vessel 2 and the lid 3 interact in order to prevent them being separated freely, and vice versa. The bayonet locking system used by the preferred embodiment shown in the figures advantageously comprises first and second series of excrescences 5A-5J, 6A-6J that are secured respectively to the lid 3 and to the vessel 2 and that are designed, for the purpose of locking and unlocking the lid 3 relative to the vessel 2, to become mutually engaged or respectively disengaged as a result of the lid 3 turning relative to the vessel 2 about the central vertical axis X-X' through a predetermined angular stroke. As is well known, the excrescences 5A-5J, 6A-6J of each of said first and second series are designed to cooperate in pairs, i.e. each excrescence of one of said series is caused, by turning the lid 3 relative to the vessel 2, to pass under a corresponding excrescence of the other series in order to lock the lid 3 relative to the vessel 2. In the embodiment shown in the figures, the excrescences 5A-5J of the first series, secured to the lid 3, project radially towards the inside of the lid 3, and are advantageously formed by local deformations of the annular skirt 3B, e.g. obtained by stamping. Preferably, and in accordance with the embodiment shown in the figures, each of said excrescences 5A-5J of the lid is formed by lancing, i.e. the localised radial deformation of the material forming the excrescence is accompanied by the presence of an opening formed through the shell of the lid 3. The opening in question is advantageously adjacent to the corresponding excrescence 5A-5J and may be obtained directly during stamping by localised and controlled tearing of the matter forming the shell under the effect of the stamping operation, or on the contrary it may be made before or after the deformation operation (e.g. by means of a cutting laser beam or any other cutter tool). Having recourse to lancing is found to be particularly advantageous since it makes it possible to obtain a three-dimensional element that is particularly rigid and strong in bending, and that is extremely simple, fast, and inexpensive to fabricate.

The excrescences 6A-6J of the second series, secured to the vessel 2, advantageously project radially outwards from the side wall 2B of the vessel 2. Nevertheless, the invention is not limited to a particular configuration of locking ramps for the bayonet system, the essential point being that the excrescences of the lid 5A-5J and of the vessel 6A-6J forming respective lid ramps and vessel ramps cooperate with one another in order to provide a mechanical connection between the vessel 2 and the lid 3 that is capable of withstanding the internal pressure that exists inside the cooking enclosure.

Figure 3:
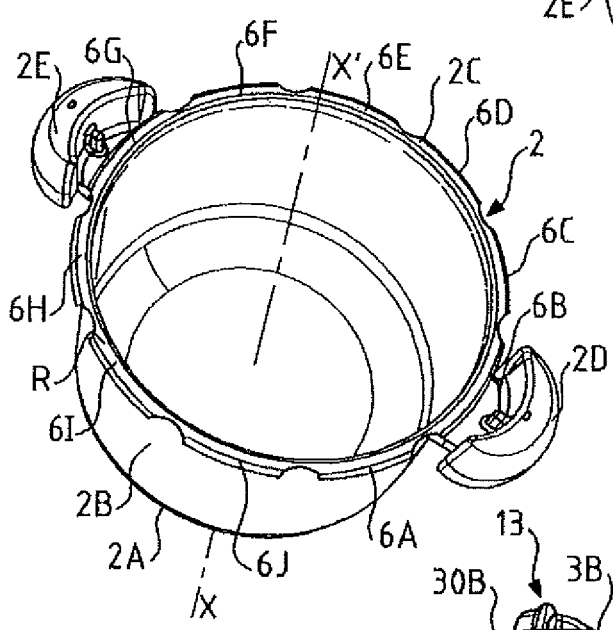
FIG. 3 shows, separately and as a diagrammatic perspective view from above, a vessel subassembly that forms a portion of the pressure cooker utensil of FIGS. 1 and 2.

Preferably, the vessel excrescences 6A-6J are formed by the top rim of the vessel 2, which rim projects outwards so as to form vessel ramps that are separated by notches (FIG. 3). Thus, when the lid 3 is placed on the vessel 2 in the pre-locking position shown in FIG. 1, the excrescences 5A-5J of the lid can pass through the notches so as to be lower down than the annular rim and thus than the vessel ramps. The utensil 1 is then in its pre-locking configuration (or its waiting-for-locking configuration), from which the locking configuration can be reached merely by turning the lid 3 relative to the vessel 2 about the vertical axis X-X', thereby having the effect of angularly offsetting the excrescences 5A-5J of the lid 3 and the notches formed in the annular rim of the vessel 2 in such a manner that the lid excrescences 5A-5J pass under the vessel excrescences 6A-6J, thereby providing "bayonet" type locking.

The utensil 1 in accordance with the invention for cooking food under pressure advantageously includes pressure regulator means 13, such as for example a valve, preferably mounted on the lid 3, e.g. so as to be carried directly by said lid 3 and arranged to maintain the pressure inside the cooking enclosure at a substantially constant predetermined value, referred to as the "operating" pressure, which exceeds atmospheric pressure by a value that lies, for example, substantially in the range 10 kilopascals (kPa) to 120 kPa, and is preferably of the order of 100 kPa.

The utensil 1 for cooking food under pressure advantageously includes other operating members, such as for example opening safety means 14 (of the kind comprising a pressure-sensitive safety finger) together with an excess pressure safety valve 15 designed to de-pressurize the utensil 1 as soon as the pressure that exists inside the enclosure exceeds a predetermined safety value.

As mentioned above, the utensil 1 also has a sealing gasket 4 interposed between the lid 3 and the vessel 2 in order to enable the pressure inside the cooking enclosure to rise. The sealing gasket 4 thus makes it possible to prevent any uncontrolled stream of steam and/or air from passing between the inside of the enclosure and the outside. For this purpose, the sealing gasket 4 is advantageously made of an elastomer material and presents natural flexibility so as to be capable of being compressed between the lid 3 and the vessel 2 so as to provide the necessary sealing. Advantageously, the sealing gasket 4 is substantially annular in shape, being complementary to the shape of the peripheral outline of the top wall 3A.

More precisely, the sealing gasket 4 includes a peripheral annular ring 7 that is advantageously received against the inside face 300B of the annular skirt 3B. The ring preferably presents a cross-section having four sides, with an outside face that is to bear against the inside face 300B of the annular skirt 3B, and an inside face placed facing the inside of the utensil, said outside and inside faces being connected together by a top face and a bottom face, e.g. extending substantially parallel to a horizontal plane. Said top face is preferably connected to the outside face via a transitional curved surface that is substantially complementary to the transitional curved surface provided between the top wall 3A and the annular skirt 3B. In this manner, under the effect of pressure rising inside the enclosure, the peripheral annular ring 7 can become pressed as a close fit in the corner formed at the junction between the top wall 3A and the annular skirt 3B (FIG. 9). Advantageously, the ring 7 presents a cross-section (visible in FIGS. 8 to 10 and 15) that is substantially constant over the entire perimeter of the sealing gasket 4. In other words, the shape of the cross-section hardly varies over the entire length of the gasket, which means in particular that the ring 7 has no geometrical discontinuities or irregularities, such as notches, that could locally modify its mechanical behavior. This technical provision enables fabrication of the gasket 4 to be simplified.

As shown in the figures, the sealing gasket 4 also has a first flexible lip 8 that extends from the ring 7, and more precisely from the inside face of said ring 7 facing towards the inside of the utensil 1, extending in a direction that is mainly radially inwards between a root 8A secured to the ring 7 and connected thereto preferably at its inside face, as shown in the figures, and a free end portion 8B in sealing contact with said top wall 3A of the lid 3, and more precisely with the inside face 30A of said top wall 3A. The first step 8 thus forms a flexible skirt that extends from the ring 7 towards the central axis X-X'. Preferably, the first lip 8 extends from the ring 7 at an angle of incidence that is upwardly oblique towards the inside of the utensil 1 so as to be stressed in bending by the weight of the lid 3 when the lid is placed on the vessel 2 (FIG. 1). Via at least its free end portion 8B, the first lip 8 comes to bear against the inside face 30A of the top wall 3A in a sealed annular zone of contact. Preferably, the first lip 8 presents a cross-section (visible in FIGS. 8 to 10 and 15) that is substantially constant over the entire perimeter of the sealing gasket 4. This means that the first lip 8 likewise does not present any geometrical discontinuities or irregularities (notch, opening, . . . ) that might locally modify its mechanical behavior. This absence of discontinuity is a source of simplicity for fabrication and for utilisation of the gasket 4, and likewise contributes to its reliability.

In the preferred embodiment shown in the figures, the sealing gasket 4 is advantageously in the form of a body of revolution about the axis X-X', thereby making it particularly easy and inexpensive to fabricate.

Advantageously, the sealing gasket 4 has a second lip 9 that is preferably likewise flexible, and that advantageously extends likewise from the ring 7 towards the inside of the utensil 1, said second lip 9 being designed to come into sealing contact with the vessel 2. As shown in the figures, the second lip 9 advantageously extends in a direction that is mainly radially inwards, between a root 9A secured to the ring 7 and a free end 9B, said second lip 9 defining a sealing surface that comes to bear in sealed manner against the vessel 2, preferably against the rest surface R, as shown in FIGS. 8 to 10, and 15. Advantageously, said second lip 9 extends from the ring 7 at an angle of incidence that is downwardly oblique towards the inside of the utensil 1 in such a manner that said first and second lips 8 and 9 extend from the ring 7 in substantially diverging manner, producing a substantially V-shaped profile.

Figure 4:
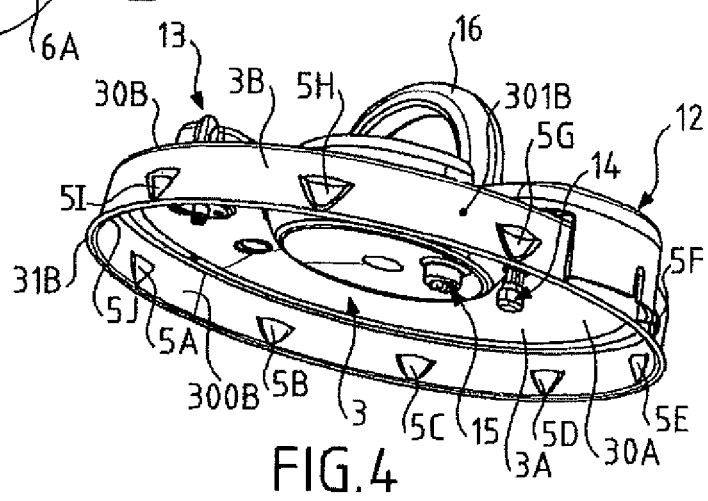
FIG. 4 shows, separately and as a diagrammatic perspective view from below, a lid subassembly that forms a portion of the pressure cooker utensil of FIGS. 1 and 2, and that is for fitting on the vessel of FIG. 3 so as to form a chamber for cooking under pressure.
Figure 11:
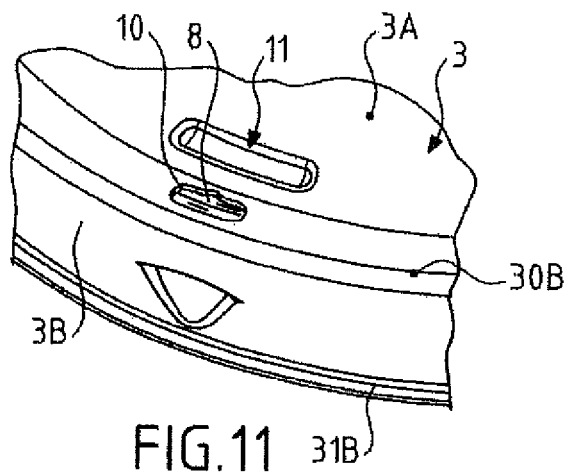
FIG. 11 is an enlarged detail of FIG. 5.

The sealing gasket 4 is preferably attached in releasable manner to the lid 3. For this purpose, the ring 7 of the sealing gasket 4 rests on the excrescences 5A-5J forming the ramps of the lid (cf FIG. 4), such that the excrescences perform both the function of holding the sealing gasket 4 (when the lid 3 is separate from the vessel 2), and the locking function (by interacting with the vessel ramps 6A-6J). When the lid 3 is placed on the vessel 2, the sealing gasket 4 is interposed between the rest surface R and the bottom face 30A of the top wall 3A of the lid 3. Under the effect of the weight of the lid 3, the first and second lips 8 and 9 are pressed towards each other, thereby providing sealing between the vessel 2 and the lid 3.

Advantageously, the sealing gasket 4 is symmetrical about a horizontal midplane P that lies between the first and second lips 8 and 9. By means of this characteristic, the gasket can be put into place between the lid 3 the vessel 2 without taking any particular precaution (the user does not need to take care to position the gasket 4 in any particular direction), which makes the utensil 1 easier to use and minimizes any risk of erroneous utilisation or operating failure.

Nevertheless, the invention is not limited to a sealing gasket presenting two lips, and by way of example it is entirely possible to envisage that the sealing gasket 4 has only the first lip 8 and that the ring 7 is itself configured to bear against the rest surface R in order to provide sealing with the vessel 2, instead of and replacing the second lip 9. Nevertheless, having recourse to two lips 8 and 9 is preferred since, as mentioned above, that makes it possible to fabricate a gasket that is symmetrical about a horizontal midplane with all of the advantages that stem therefrom.

The utensil 1 also has a leakage opening 10 formed through the top wall 3A, above the sealing gasket 4, so as to be closed hermetically by the gasket so long as the pressure that exists inside the cooking enclosure does not exceed a safety threshold, which threshold is preferably greater than the predetermined safety value at which the safety valve 15 triggers. The leakage opening 10 thus passes through the top wall 3A along a substantially vertical perforation axis, i.e. an axis parallel to the central axis X-X'. The leakage opening 10 is provided in a zone of the top wall 3A that is sufficiently close to its periphery for the leakage opening 10 to be masked on the inside by the sealing gasket 4, and preferably by its first lip 8, as shown in FIGS. 8 to 10, and 15. As a result, the outside face of the first lip 8 comes locally into register with the underside of the window formed by the leakage opening 10, which is itself formed locally through the top wall 3A, preferably towards its periphery. In the embodiment shown in the figures, the leakage opening 10 extends in the radial direction (i.e. a direction intersecting the central axis X-X') between an outside edge 10A and an inside edge 10B situated between the outside edge 10A and the central axis X-X' in the radial direction. Preferably, so long as the pressure within the enclosure does not exceed the safety threshold, the inside edge 10B is in register with a zone of the first lip 8 that is situated between the root 8A and the end portion 8B, and preferably in the immediate proximity of said free end portion 8B. This portion thus advantageously comes to bear in sealing manner against the inside face 30A of the top wall 3A in the vicinity of the inside edge 10B of the leakage opening 10. The outside edge 10A of the leakage opening 10 is placed in register with a zone of the first lip 8 that is situated between the root 8A and the free end portion 8B, preferably in the proximity of the root 8A, so that the ring 7 is advantageously not in register with the leakage opening 10, and on the contrary is entirely covered by the top wall 3A.

In the examples shown in the figures, the utensil 1 has only one leakage opening 10. It is nevertheless perfectly possible to envisage having recourse to a plurality of leakage openings arranged at different locations in the top wall 3A.

As shown in the figures, the annular skirt 3B forms a top abutment for the ring 7, preventing any outward radial movement of the gasket 4 in register with the leakage opening 10. In other words, the outside face of the ring 7 is placed permanently against the annular skirt 3B, such that the ring 7 cannot be subjected to any outward (centrifugal) radial movement, at least in the vicinity of the leakage opening 10. This means that when centrifugal radial thrust acts on the sealing gasket 4 as a result of the rise in pressure inside the enclosure, the gasket 4 is prevented from moving freely outwards by the annular skirt 3B against which the ring 7 presses. As shown in the figures, the ring 7 is advantageously in abutment against the annular skirt 3B, at least in a region of the skirt that is situated in the vicinity of the leakage opening 10 (which region lies at least in part in a radial plane that also passes through said leakage opening 10), with this applying regardless of the level of pressure inside the enclosure, and in particular even when said pressure level is lower than the safety threshold.

Thus, the ring 7 is substantially incapable of moving locally outwards, i.e. of being subjected locally to a centrifugal radial movement, even when the pressure exceeds the safety threshold, since it is already substantially pressed against the inside face of the annular skirt 3B.

Advantageously, and as shown in the figures, the outline of the gasket is substantially regular and continuous, with the outside face of the ring 7 being free in particular of any local notches or recesses as are to be found in the prior art, which would require the gasket 4 to be provided with indexing means.

Advantageously, the annular skirt 3B does not have any gasket extrusion opening formed in line with the leakage opening 10 or in its vicinity. The annular skirt 3B thus locally prevents the sealing gasket 4 from being subjected to an overall outward movement.

By means of this characteristic, the invention does not suffer from the various drawbacks of the prior art associated with the need to cause the ring of the gasket to pass locally through an extrusion window formed in the dropped edge of the lid. On the contrary, in this example, the ring 7 is incapable of passing through the annular skirt 3B, at least in the vicinity of and/or in line with the leakage opening 10.

Nevertheless, the first lip 8 presents appropriate flexibility, or in other words sufficient flexibility, to ensure that the free end portion 8B is locally pushed back through the leakage opening 10 under the effect of the drive force exerted by the pressure that exists within the enclosure, as soon as the pressure inside the enclosure exceeds said safety threshold, thus causing the inside of the enclosure to communicate through the leakage opening 10 with the outside so as to cause the pressure in the enclosure to drop.

The safety threshold thus corresponds to a predetermined pressure value from which the drive force exerted by the pressure inside the enclosure on the portion of the first lip 8 closing the leakage opening 10 becomes sufficient to cause the first lip 8 to deform locally, enabling the free end portion 8B to penetrate locally through the leakage opening 10, and possibly even to pass locally through the leakage opening 10, so as to interrupt the sealing locally and thus put the inside of the enclosure in communication with the outside via the leakage opening 10. The first lip 8 is thus sufficiently flexible, and its free end portion 8B is located sufficiently close to the leakage opening 10 (and specifically to its inside edge 10B) to ensure that when the safety threshold is exceeded, the extreme portion 8B slides locally along and against the inside face 30A of the top wall 3A until it comes locally into register with the leakage opening 10, through which it is then locally pushed back by the pressure.

The invention thus relies in particular on the idea of making use exclusively on the local deformation of a lip facing a top opening formed in the lid, and not, as in the prior art, on making use of centrifugal radial movement of the gasket seeking to shift the lip radially in order to uncover a leakage opening.

The sealing gasket 4 is advantageously made of silicone, and by way of example it may present hardness on the Shore A scale lying in the range 50 to 80, and preferably in the range 55 to 65.

Figure 16:
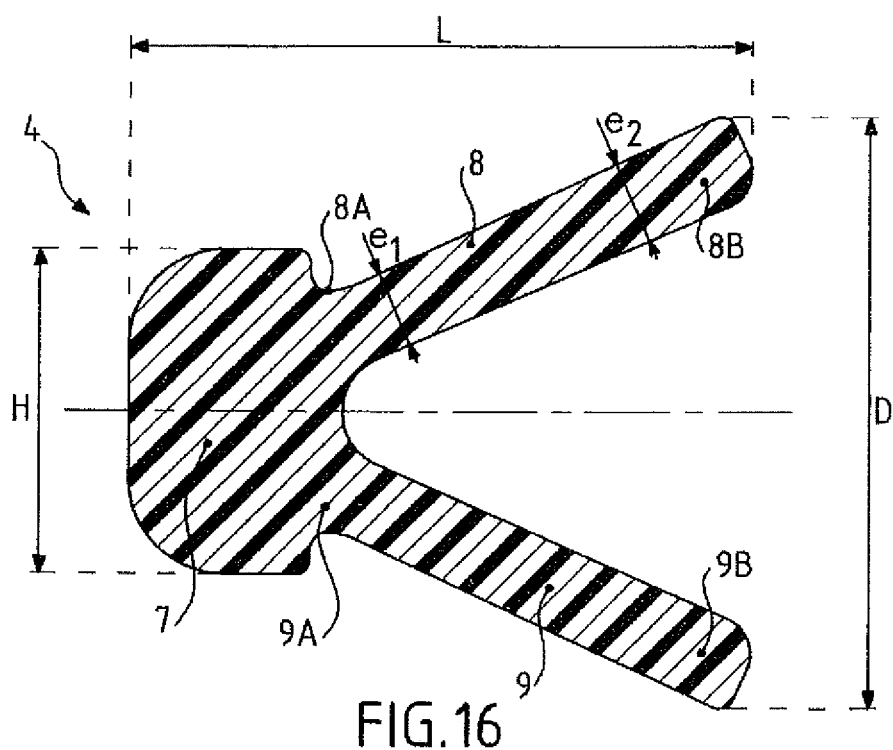
FIG. 16 is a cross-section of a variant embodiment of the gasket fitted to the utensil of the preceding figures.

Having recourse to silicone of hardness lying in the above range, in combination with a suitable thickness for the first lip 8, e.g. lying in the range 1 millimeter (mm) to 2.5 mm, makes it possible in optimum manner to obtain the looked-for effect of localized deformation of the first lip 8 that enables steam to escape via the opening 10. In the example of FIG. 16, the gasket 4 presents the following dimensions, by way of example:

- a ring height H lying substantially in the range 3 mm to 9 mm, e.g. about 7 mm;
- a length L measured in the radial direction lying substantially in the range 8 mm to 18 mm, e.g. about 13 mm;
- an inter-lip spread D, measured at the free ends of the lips 8 and 9 lying substantially in the range 8 mm to 18 mm, e.g. about 12 mm; and
- a thickness for the first lip 8 of the order of 1.5 mm to 1.9 mm, e.g. having a thickness $e_1$ of the first lip 8 as measured in the vicinity of the root 8A that is about 1.6 mm, and a thickness $e_2$ of the first lip 8 as measured in the vicinity of the free end 8B that is about 1.8 mm.

The particular arrangement of the sealing gasket 4 relative to the opening 10, and the appropriate flexibility of its first lip 8, thus serve to release the excess pressure in a particularly well-controlled manner, without having recourse to any radial movement of the gasket through an extrusion window as in the prior art. The invention thus makes it possible to reduce very significantly the dispersion in value for the safety threshold. Also, the steam escaping through the leakage opening 10 is propelled substantially upwards and therefore does not run the risk of putting out the flame of the hob or of causing the utensil 1 to be moved by a reaction effect.

Figure 12:
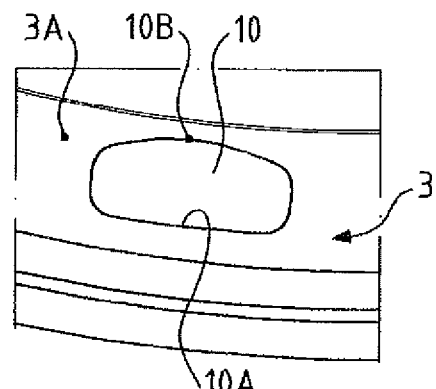
FIG. 12 is a plan view of a detail of FIG. 11, including the leakage opening formed in the lid.
Figure 13:
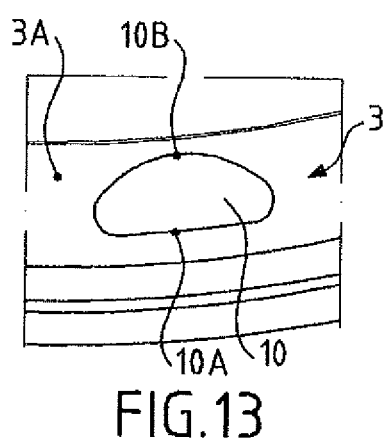
FIGS. 13 and 14 show respectively two alternative variant embodiments of the leakage opening.
Figure 14:
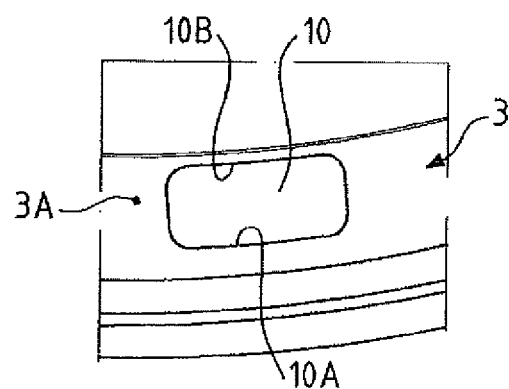

In order to enable a leak of steam to appear at the desired accurate safety threshold, the leakage opening 10 advantageously presents a substantially elongate shape (as shown in the figures), e.g. being generally oblong in shape, and it is arranged in such a manner as to extend longitudinally in a tangential direction that is substantially perpendicular to the radial direction. In other words, the leakage opening is of a shape that is substantially longer than it is wide and its long direction extends substantially perpendicularly to the radial direction, in such a manner that sealing is interrupted by the free end portion 8B being moved transversely to the long side (edge 10*b*) of the leakage opening 10. Advantageously, and as shown in the figures, the leakage opening 10 presents an inner long edge 10B that is curved towards the inside of the lid 3, i.e. towards the central axis X-X'. This curvature towards the inside favors controlled and progressive triggering of the leak, by enabling the first lip 8 to uncover a zone of the leakage opening 10 progressively so that its area becomes larger and larger. In the example shown in FIGS. 1 to 12, the leakage opening presents an outside long edge 10A that is substantially rectilinear and an inside long edge 10B that is substantially curved so that the outline of the leakage opening 10 presents a shape that is substantially convex. In the alternative variant of FIG. 13, the outside long edge 10A is once more rectilinear, while the inside long edge 10B is curved with curvature that is more marked than in the example of FIG. 12. Finally, in the alternative example of FIG. 14, the leakage opening 10 presents a shape that is substantially rectangular with its outside and inside long edges 10A and 10B being substantially rectilinear and parallel to each other.

The invention thus makes it possible to trigger the phenomenon of the safety leak though the opening 10 accurately, which leak phenomenon occurs at a pressure level that is significantly lower than the level at which sealing might be interrupted between the bottom lip 9 and the vessel 2. One of the advantages of the invention in its preferred embodiment lies in particular in the fact that the phenomenon of the safety leak via the opening 10 is independent of the nature of the sealing contact between the second lip 9 and the vessel 2.

Naturally, the invention is not limited to a specific shape for the leakage opening 10, even though an asymmetrical shape with a curved inside long edge 10B is preferred.

In order to compensate for potential local weakening of the lid 3 as a result of the presence of the leakage opening 10 formed through the top wall 3A, said lid 3 advantageously includes reinforcement 11 that is radially in alignment with the leakage opening 10 and that is arranged between the center of the lid 3 (through which the central axis X-X' passes) and said leakage opening 10. The reinforcement 11 is preferably formed by a locally deformed zone of the lid 3, and in even more preferred manner by a stamped zone of the lid 3. In the embodiment shown in the figures, said stamped zone is located in the vicinity of the leakage opening 10, and it is in the form of a local deformation of the top wall 3A going towards the inside of the utensil 1. Said stamped zone is preferably substantially elongate and it extends substantially parallel to the leakage opening 10, over a length that is preferably longer than the length of the leakage opening 10.

Advantageously, the leakage opening 10 is substantially in radial alignment with one of the excrescences 5A-5J of the lid 3, said excrescence, e.g. when it is in the form of localized deformation of the annular skirt 3B, specifically contributing to mechanically compensating for the local weakening of the lid 3 resulting from the presence of the opening 10.

Figure 15:
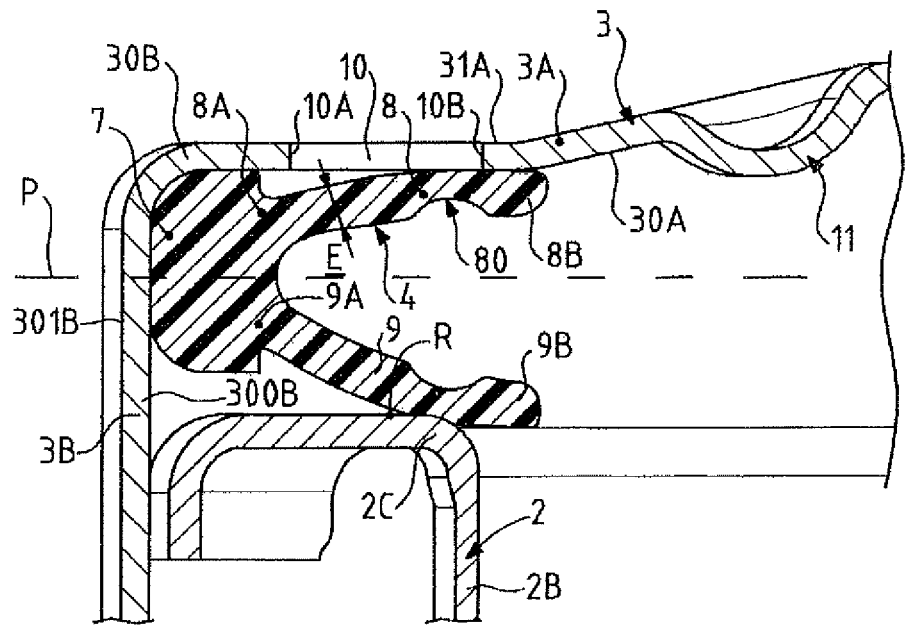
FIG. 15 is a diagrammatic section view showing an alternative variant embodiment of the gasket fitted to the utensil of the preceding figures, which gasket is characterized by local thinning of its top and bottom lips.

Preferably, in accordance with the embodiment of FIG. 15, the first lip 8 has an intermediate portion 80 situated between said root 8A and the free end portion 8B, the thickness of said intermediate portion 80 being less than the thickness of the free end portion 8B so as to enhance the flexibility of the first lip 8 and the ability of the free end portion 8B to be pushed through the leakage opening 10 as soon as the pressure inside the enclosure exceeds the safety threshold.

For example, as shown in the figures, the thickness E of the first lip 8 is substantially constant between the root 8A and the free end portion 8B, or at least it varies progressively between the root 8A and the free end portion 8B, except in a zone corresponding to the intermediate portion 80 where the thickness E is locally significantly smaller.

In other words, the intermediate portion 80 is in the form of a thinned portion that makes it possible locally to obtain a hinge that facilitates local bending of the first lip 8 and thus facilitates passage of the free end portion 8B through the leakage opening 10. The thinned intermediate portion 80 is preferably situated in the immediate vicinity of the free end portion 8B so as to be closer to said free end portion 8B than to the root 8A. In this preferred embodiment, the first lip 8 benefits from being suitable for deformation that is controlled by two hinges, one formed by the connection between the first lip 8 and the ring 7 at the root 8A, and the other formed by the thinned intermediate portion 80 in the proximity of the free end portion 8B. Such a special shape for the first lip 8 provides excellent control over the loss of sealing and guarantees reliability for the steam leak mechanism. Having recourse to a thinned intermediate portion 80 is nevertheless not absolutely essential and it is entirely possible to envisage that the thickness E of the first lip 8 is substantially constant, or at least does not present any local thinning.

Advantageously, as shown in particular in FIGS. 1, 2, 6, and 7, the cooking utensil 1 has a cap 12 that covers the lid 3 in part, and that by way of example is in the form of a piece of plastics material arranged on the lid 3 so as to overlie the outside face 31A of the top wall 3A locally. In this preferred embodiment, the lid 3 is mounted to be movable relative to said cap 12 between a locking position in which the cap 12 covers the leakage opening 10 (FIGS. 2 and 7) and an unlocking position (FIGS. 1 and 6) in which the cap 12 uncovers said leakage opening 10, at least in part and preferably in full. Thus, when the lid 3 is unlocked relative to the vessel 2, the leakage opening 10 is entirely visible and accessible, thereby making it easier for the user to inspect it and to maintain it since the user can easily inspect its functional state and then clean it, should that be necessary. In contrast, when the lid 3 is locked relative to the vessel 2, the leakage opening 10 lies under the cap 12, thus making it possible in the event of steam escaping via the opening 10 to prevent the corresponding jet of steam from striking the user directly.

In preferred manner, the cap 12 is formed by a piece in the form of a cross-bar with the lid 3 being mounted to turn relative thereto about the central axis X-X'. The cross-bar in question projects radially beyond the lid 3 so as to be capable of co-operating with the handles 2D and 2E in order to block the cross-bar angularly in position in a horizontal plane. This angular blocking position corresponds to the position shown in FIG. 1 while waiting to be locked. Starting from this waiting position, the user can cause the lid 3 to turn relative to the cap-forming cross-bar 12, e.g. by actuating a control member 16 that is specifically constituted by a loop-shaped handle that can be folded down. The lid can then be turned relative to the cap 12 so as to be taken into a locked position corresponding to mutual engagement between the excrescences 5A-5J of the lid 3 and the excrescences 6A-6J of the vessel 2. The utensil 1 is then ready for a rise in pressure, and the leakage opening 10 is masked by a screen formed by the cap 12, which prevents any direct jet of steam passing through the leakage opening 10 towards the user.

The invention also provides a method as such for safely depressurizing a utensil 1 for cooking food under pressure, which utensil is preferably in compliance with the above description. The safe depressurizing method of the invention is thus advantageously a method of safely depressurizing the above utensil 1 as described above. When the pressure exceeds the safety threshold, the method comprises a step of the first lip 8 deforming during which said first lip 8 is subjected under the effect of the pressure that exists inside the enclosure to bending that is sufficient for the free end portion 8B to be pushed locally through the leakage opening 10, thus putting the inside of the enclosure into communication with the outside via the leakage opening 10 so as to cause the pressure inside the enclosure to drop. The ring 7 is held, preferably by the annular skirt 3B which acts locally as an abutment, so as to prevent any outward radial movement of the sealing gasket 4 in register with the leakage opening 10 under the effect of the pressure that exists inside the enclosure.

An implementation of this method is shown in chronological order by FIGS. 8 to 10. In FIG. 8, the sealing gasket 4 is interposed between the vessel 2 and the lid 3 in such a manner that the ring 7 bears against the inside face 300B of the annular skirt 3B, while the first and second lips 8 and 9 come respectively into contact with the inside face 30A of the top wall 3A of the lid 3 and with the top edge (rest surface R) of the vessel 2. Thereafter, under the effect of the pressure that exists inside the enclosure increasing, the ring 7 comes into abutment in the corner formed by the junction between the top wall 3A and the annular skirt 3B, while the first and second lips 8 and 9 bend (FIG. 9). Under the effect of this bending of the first lip 8, the free end portion 8B of the lip will tend to slide along and against the inside face 30A of the top wall 3A so as to come progressively closer to the leakage opening 10. Thereafter, once the pressure inside the enclosure exceeds the safety threshold, which safety threshold advantageously corresponds to an abnormal level of pressure that is reached only when the other safety members (pressure regulator valve 13, pressure safety valve 15, etc.) have not functioned, the bending to which the first lip 8 is subjected locally becomes such that the free end portion 8B passes locally through the leakage opening 10, thereby causing steam to leak out and enabling the pressure that exists inside the enclosure to be brought back to a level that is compatible with safety for the user.

The invention claimed is:

1. A cooking utensil for cooking food under pressure and comprising:
    a vessel;
    a lid for co-operating with said vessel to form a cooking enclosure, said lid having a top wall presenting a peripheral outline that is circular or oval and from which there extends an annular skirt;
    a sealing gasket interposed between the lid and the vessel in order to enable the pressure inside the cooking enclosure to rise, said sealing gasket comprising:
        a peripheral annular ring; and
        a first flexible lip projecting from said peripheral annular ring towards the inside of the cooking utensil in a direction that is mainly radially inwards, between a root secured to the peripheral annular ring and a free end portion in sealing contact with said top wall of the lid; and
    a leakage opening formed through said top wall above the sealing gasket so as to be hermetically closed by the sealing gasket so long as the pressure that exists inside the enclosure does not exceed a safety threshold,
    wherein the annular skirt forms a stop abutment for the peripheral annular ring preventing any outward radial movement of the sealing gasket in register with the leakage opening, and
    wherein said first flexible lip enables the free end portion to be pushed back locally through the leakage opening as soon as the pressure that exists inside the enclosure exceeds said safety threshold, thus causing the inside of the enclosure to communicate with the outside via the leakage opening in order to cause the pressure inside the enclosure to drop,
    wherein said lid includes a reinforcement in the form of a local deformation of the top wall extending toward the inside of the cooking utensil and that is radially in alignment with the leakage opening and arranged between the center of the lid and said leakage opening.

2. A cooking utensil according to claim 1, wherein said leakage opening is elongate in shape and is arranged so as to extend longitudinally in a tangential direction that is perpendicular to the radial direction.

3. A cooking utensil according to claim 2, wherein said leakage opening presents an inside long edge that is curved towards the inside of the lid.

4. A cooking utensil according to claim 1, wherein said reinforcement is formed by a stamped zone of the lid.

5. A cooking utensil according to claim 1, wherein the peripheral annular ring presents a cross-section that is constant over the entire perimeter of the sealing gasket.

6. A cooking utensil according to claim 1, wherein said first flexible lip presents a cross-section that is constant over the entire perimeter of the sealing gasket.

7. A cooking utensil according to claim 1, wherein said sealing gasket is in the form of a body of revolution.

8. A cooking utensil according to claim 1, wherein said first flexible lip extends from said peripheral annular ring at an upwardly oblique angle towards the inside of the cooking utensil.

9. A cooking utensil according to claim 1, wherein said first flexible lip includes an intermediate portion between said root and said free end portion, the thickness of said intermediate portion being less than the thickness of said free end portion so as to enhance the flexibility of the first flexible lip.

10. A cooking utensil according to claim 1, wherein said sealing gasket has a second flexible lip extending from said peripheral annular ring towards the inside of the cooking utensil, said second flexible lip being for coming into sealing contact with the vessel.

11. A cooking utensil according to claim 10, wherein said sealing gasket is symmetrical about a horizontal midplane passing between the first and second flexible lips.

12. A cooking utensil according to claim 1, further comprising a locking/unlocking system for locking and unlocking the lid relative to the vessel, said locking/unlocking system being a bayonet system or a movable jaw system or a movable segment system.

13. A cooking utensil according to claim 1, further comprising a cap covering part of the lid, said lid being mounted to move relative to the cap between a locked position in which the cap covers said leakage opening, and an unlocked position in which the cap uncovers said leakage opening.

14. A cooking utensil according to claim 1, further comprising:
- a bayonet system for locking and unlocking the lid relative to the vessel, said bayonet system comprising first and second series of excrescences that are secured respectively to the lid and to the vessel and are configured to become mutually engaged or disengaged as a result of the lid turning relative to the vessel,
- wherein the leakage opening is substantially in radial alignment with one of the excrescences of the first series of excrescences.

15. A method of safely depressurizing a utensil for cooking food under pressure, the utensil comprising: a vessel, a lid for co-operating with said vessel to form a cooking enclosure, said lid having a top wall presenting a peripheral outline that is circular or oval and from which there extends an annular skirt, a sealing gasket interposed between the lid and the vessel in order to enable the pressure inside the cooking enclosure to rise, wherein said sealing gasket comprises a peripheral annular ring and a first flexible lip projecting from said peripheral annular ring towards the inside of the utensil in a direction that is mainly radially inwards, between a root secured to the peripheral annular ring and a free end portion in sealing contact with said top wall of the lid, and, a leakage opening formed through said top wall above the sealing gasket so as to be hermetically closed by the sealing gasket so long as the pressure that exists inside the enclosure does not exceed a safety threshold, wherein said lid includes a reinforcement that is in the form of a local deformation of the top wall extending toward the inside of the cooking utensil and that is radially in alignment with the leakage opening and arranged between the center of the lid and said leakage opening, said method, when the pressure exceeds the safety threshold, comprising the steps of:
- deforming the first flexible lip during which said first flexible lip bends sufficiently to cause the free end portion to be pushed locally through the leakage opening causing the inside of the enclosure to communicate with the outside through the leakage opening, thereby causing the pressure inside the enclosure to drop; and
- holding, via the annular skirt, the peripheral annular ring such that any outward radial movement of the sealing gasket in register with the leakage opening is prevented under the effect of the pressure that exists inside the enclosure.

* * * * *